United States Patent
Claremont et al.

(10) Patent No.: US 7,124,097 B2
(45) Date of Patent: Oct. 17, 2006

(54) METHOD AND SYSTEM FOR ORDERING A CONSUMABLE FOR A DEVICE

(75) Inventors: Timothy S. Claremont, Webster, NY (US); Erika C. Dabney, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 596 days.

(21) Appl. No.: 10/053,416

(22) Filed: Jan. 23, 2002

(65) Prior Publication Data

US 2003/0139973 A1 Jul. 24, 2003

(51) Int. Cl.
*G06Q 30/00* (2006.01)
(52) U.S. Cl. ....................................................... 705/26
(58) Field of Classification Search .................. 705/26, 705/27
See application file for complete search history.

(56) References Cited

U.S. PATENT DOCUMENTS

| | | | |
|---|---|---|---|
| 3,409,901 A | 11/1968 | Dost et al. ................... 347/122 |
| 4,468,112 A | 8/1984 | Suzuki et al. ................. 399/29 |
| 4,847,659 A | 7/1989 | Resch, III .................... 399/58 |
| 4,908,666 A | 3/1990 | Resch, III .................... 399/61 |
| 4,922,294 A | 5/1990 | Nakagami et al. ........... 399/10 |
| 4,961,088 A | 10/1990 | Gilliland et al. .............. 399/25 |
| 5,204,698 A | 4/1993 | LeSueur et al. ............. 347/140 |
| 5,204,699 A | 4/1993 | Birnbaum et al. .......... 347/131 |
| 5,272,503 A | 12/1993 | LeSueur et al. .............. 399/25 |
| 5,283,613 A | 2/1994 | Midgley, Sr. .................. 399/9 |
| 5,636,032 A | 6/1997 | Springett .................... 358/296 |
| RE35,751 E | 3/1998 | Midgley ........................ 399/25 |
| 5,765,143 A * | 6/1998 | Sheldon et al. ............... 705/28 |
| 5,918,085 A | 6/1999 | Rollins et al. ................. 399/27 |
| 6,016,409 A | 1/2000 | Beard et al. |
| 6,029,141 A * | 2/2000 | Bezos et al. .................. 705/27 |
| 6,106,088 A | 8/2000 | Wafler ........................... 347/7 |
| 6,106,409 A | 8/2000 | Jackson ...................... 473/278 |
| 6,113,208 A | 9/2000 | Benjamin et al. .............. 347/7 |
| 6,181,885 B1 | 1/2001 | Best et al. .................... 399/12 |
| 6,233,408 B1 * | 5/2001 | Allen ............................ 399/8 |
| 6,272,472 B1 * | 8/2001 | Danneels et al. ............ 705/27 |
| 6,334,111 B1 * | 12/2001 | Carrott ........................ 705/14 |
| 6,430,711 B1 * | 8/2002 | Sekizawa ..................... 714/47 |
| 6,483,292 B1 * | 11/2002 | Kochi ....................... 324/158.1 |
| 6,529,692 B1 * | 3/2003 | Haines et al. ................. 399/27 |
| 6,556,890 B1 * | 4/2003 | Whaley ...................... 700/244 |
| 6,572,318 B1 * | 6/2003 | Cobene et al. ................ 412/11 |

(Continued)

FOREIGN PATENT DOCUMENTS

JP    8-187921 A  *  7/1996

(Continued)

OTHER PUBLICATIONS

Anon. "Data as a Working Arm,"PC Week, vol. 6, No. 1, p. 56, Jan. 9, 1989.*

(Continued)

*Primary Examiner*—Nicholas D. Rosen
(74) *Attorney, Agent, or Firm*—Nixon Peabody, LLP

(57) ABSTRACT

A method for ordering one or more consumables for a device includes selecting one or more of the consumables used in the device to order using the device and submitting the order for the selected consumables using the device to one or more suppliers. A device for ordering one or more consumables for the device includes an ordering system in the device and a communication system in the device. The ordering system providing a menu of one or more of the consumables to select to place an order. The communication system submits the order for the selected consumables when completed.

21 Claims, 3 Drawing Sheets

U.S. PATENT DOCUMENTS

| | | | |
|---|---|---|---|
| 6,629,134 B1 * | 9/2003 | Hayward et al. | 709/217 |
| 6,798,997 B1 * | 9/2004 | Hayward et al. | 399/12 |
| 6,937,999 B1 * | 8/2005 | Haines et al. | 705/26 |
| 6,947,161 B1 * | 9/2005 | Suyehira | 358/1.15 |
| 6,999,190 B1 * | 2/2006 | Shimbori et al. | 358/1.15 |
| 7,031,933 B1 * | 4/2006 | Harper | 705/26 |
| 7,043,523 B1 * | 5/2006 | Haines et al. | 709/203 |
| 2002/0022990 A1 * | 2/2002 | Kurata et al. | 705/14 |
| 2002/0040333 A1 * | 4/2002 | Fuwa | 705/27 |
| 2002/0072998 A1 * | 6/2002 | Haines | 705/28 |
| 2003/0018534 A1 * | 1/2003 | Zack et al. | 705/22 |
| 2003/0041098 A1 * | 2/2003 | Lortz | 709/203 |
| 2003/0046171 A1 * | 3/2003 | Whale | 705/26 |
| 2003/0074268 A1 * | 4/2003 | Haines | 705/26 |
| 2003/0158790 A1 * | 8/2003 | Kargman | 705/26 |
| 2003/0200160 A1 * | 10/2003 | Aruga et al. | 705/28 |
| 2005/0240518 A1 * | 10/2005 | Ishizuka | 705/39 |

FOREIGN PATENT DOCUMENTS

| | | |
|---|---|---|
| JP | 2001-24838 A * | 1/2001 |
| JP | 2001-215231 A * | 8/2001 |

OTHER PUBLICATIONS

Alonso, M.R., "Virtual Jackets, Custom Fit ," Printing Impressions, vol. 41, No. 4, p. 58, Sep. 1998.*

Anon., "PAperStudio Opens Small-Run Printing Web Site Bebruary 4, 1999," Newsbytes, Feb. 4, 1999.*

Anon,, "Instantly Re-Order Toner Cartridges, Online Using HP's Smartchip," M2 Presswire, Oct. 19, 2001.*

Anon., "HP Threatens Java Hope," Christchurch Press, p. 27, Mar. 24, 1998.*

Orr, A., "Java Being Diluted by too Many Flavours," Financial Express, Nov. 10, 1998.*

Fox, B., "We Know What You're Printing," new Scientist, vol. 172, No. 2316, p. 24, Nov. 10, 2001.*

U.S. Appl. No. 09/397,125, filed Sep. 16, 1999, pending, Ken Hayward et al., entitled Context Sensitive Web-Based User Support.

U.S. Appl. No. 09/397,126, filed Sep. 16, 1999, pending, Ken Hayward et al., entitled Context Sensitive Web-Based User Support.

U.S. Appl. No. 09/662,198, filed Sep. 14, 2000, pending, Ken Hayward et al., entitled Supply Ordering Apparatus.

U.S. Appl. No. 09/662,284, filed Sep. 14, 2000, pending, Ken Hayward et al., entitled Method For Supply Ordering.

U.S. Appl. No. 09/740,505, filed Sep. 19, 2000, pending, Karl E. Kurz et al., entitled Method For Providing Information For a Customer Replacement Unit.

U.S. Appl. No. 09/740,603, filed Sep. 19, 2000, pending, Karl E. Kurz et al., entitled System For Providing Information For a Customer Replacement Unit.

J. Richard, "Lexmark Printer Supplies Monitor Acts As "Gas Gauge" For Inkjet Printers", http://reseller.lexmark.com/US/Corporate/Press/PressRelease/0,1196,709,00.html, retrieved Dec. 10, 2001.

* cited by examiner

METHOD AND SYSTEM FOR ORDERING A CONSUMABLE FOR A DEVICE

FIELD OF THE INVENTION

This invention relates generally to systems and methods for ordering supplies and, more particularly, to a method and system for a ordering at least one consumable for a device using the device.

BACKGROUND OF THE INVENTION

With devices, such as printers, copy machines, or facsimile machines, consumables, such as dry ink, a feed roll cartridge, a fuser module, a fuser web, or staples, will eventually run low or run out. When this occurs, an individual typically will either call a supply center and place an order, fill out and send an order form to the supply center, or travel to the supply center to place the order for the needed consumables. The order for the consumables is then filled and returned by or to the individual for use in the device as needed.

Unfortunately, there are several drawbacks to this process for supply or resupplying the device with consumables. For example, the process is very time consuming because typically an individual will have to travel to several different stores to check whether the stores even carry the particular consumable and if they do at what price and in what quantities. Additionally, with this process there is a chance that the operator may purchase the wrong type of consumable or consumables for the device. Further, the original manufacturer and original retailer have no influence on the operator's selection of a supplier or suppliers for the consumable or consumables. As a result, these sales may end up going to a competitor of the original manufacturer of the device.

SUMMARY OF THE INVENTION

A method in accordance with embodiments of the present invention includes displaying with a device a status of consumables and information about ordering at least one of the consumables when at least one condition occurs. The device monitors for an input indicating that an order for the consumable has been placed. The device submits the order for the consumable to a supplier if the monitored input indicates an order should be placed.

A system in accordance with embodiments of the present invention includes a display system, a monitoring system, and an ordering system. The display system with the device displays a status of the consumable and information about ordering the consumable when at least one condition occurs. The monitoring system with the device monitors for an input indicating that an order for the consumable has been placed. The ordering system with the device that submits the order for the consumable to a supplier if the monitored input indicates an order should be placed.

A method for ordering at least one consumable for a device in accordance with embodiments of the present invention includes submitting an order for the at least one consumable for the device and processing the order for the consumable. The processing includes retrieving information about the device that placed the order. A distribution of at least a portion of a payment for the order is determined based on the retrieved information.

A system for ordering at least one consumable for a device in accordance with embodiments of the present invention includes an ordering system, a processing system, and a payment distribution system. The ordering system submits an order for the at least one consumable for the device. The order processing system processes the order for the consumable, wherein the order processing system retrieves information about the device that placed the order. The payment distribution system determines a distribution of at least a portion of a payment for the order based on the retrieved information.

The present invention makes the process of ordering or reordering consumables for a device fast, easy, and convenient. The customer is able to save time by being able to reorder consumables directly from the device. This time savings increases the customer's productivity by minimizing the interruption to the customer's work day.

In addition to simplifying the order or reordering process, the present invention also helps direct the business for the sale of the consumables back to the original retailer or another retailer. This can result in a substantial increase in revenues for the original retailer from the sales of these consumables over the life of the device.

While simplifying the ordering process, the present invention also helps to maintain or preserve the business relationship between the original retailer of the device and the manufacturer of the device or another supplier who has filled the order for the consumable by redirecting a portion of the payment for the sale of consumable back to the original retailer. As a result, even though the original retailer did not make the sale for the consumable, the original retailer shares in the profits of the sale.

DETAILED DESCRIPTION OF THE INVENTION

Figure 1:
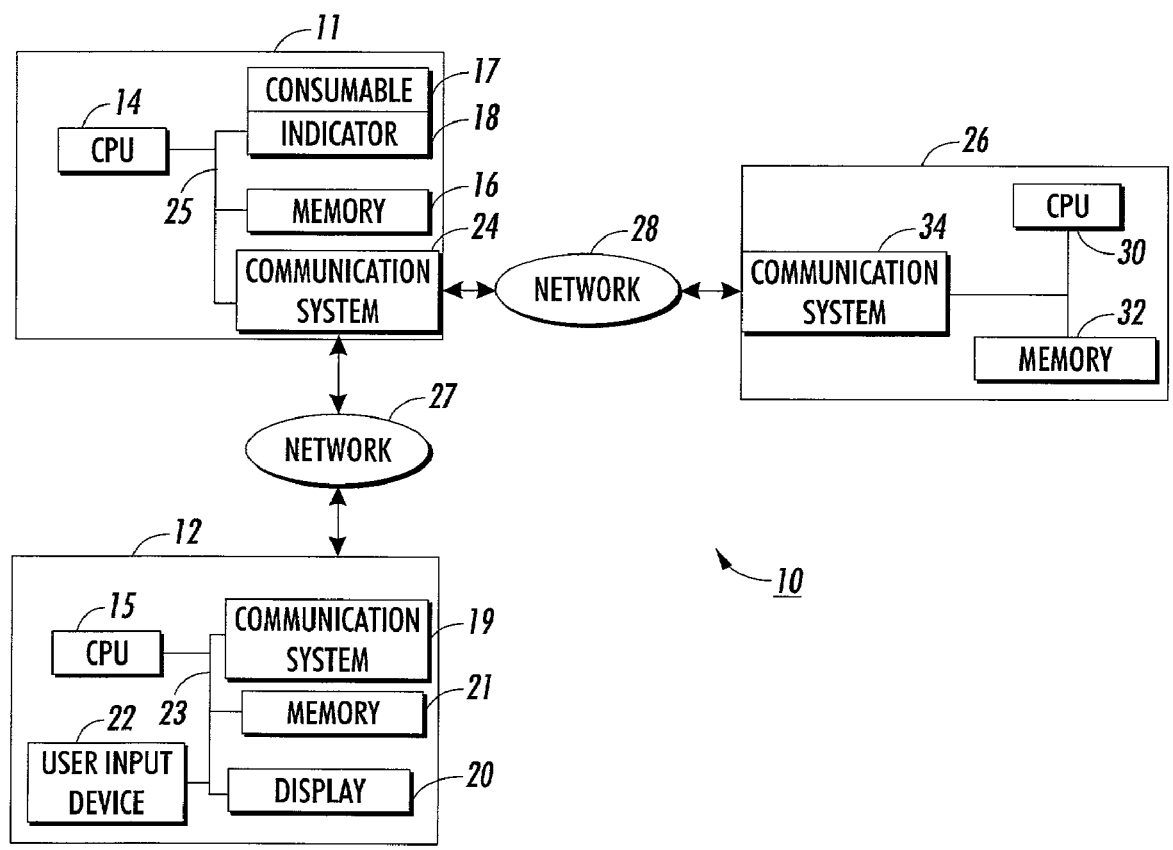
FIG. 1 is a block diagram of a device for ordering at least one consumable for the device using the device in accordance with the present invention.

A system 10 for ordering at least one consumable 17 for a printing device 11 in accordance with one embodiment of the present invention is illustrated in FIG. 1. One embodiment of the system 10 includes a printing device 11, an operator system 12, and a supplier processing system 26. One embodiment of the method includes displaying a status of and information about ordering at least one consumable 17, monitoring for an input indicating that an order for the displayed consumable 17 has been placed, and submitting the order for the consumable 17 to a supplier if the monitored input indicates an order should be placed. Another embodiment of the method includes redirecting a portion of the payment for the sale of consumable back to the original retailer. The present invention makes the process of ordering at least one consumable 17 for a device fast, easy, and convenient while maintaining business relationships.

Referring to FIG. 1, in this particular embodiment, the printing device 11 is a printer, although the printing device 11 could be a variety of different types of machines, apparatuses, or systems, such as a copy machine or a facsimile machine. Additionally, in this particular embodiment, one consumable 17, such as dry ink, a feed roll cartridge, a fuser module, a fuser web, or staples, is shown, although the printing device 11 can have more then one consumable 17.

The printing device 11 includes a central processing unit (CPU) or processor 14, a memory 16, an indicator or indication system 18, and a communication system 24 which are coupled together by a bus system or other link 25, respectively, although the printing device 11 may comprise other components, other numbers of the components, and other combinations of the components. The processor 14 may execute one or more programs of stored instructions for at least a portion of the method for ordering at least one consumable 17 for the printing device 11 in accordance with one embodiment of the present invention as described herein and illustrated in FIG. 2. In this particular embodiment, those programmed instructions are stored in memory 16, although some or all of those programmed instructions could be stored and retrieved from and also executed at other locations, such as in a operator system 12 coupled to printing device 11. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 14, can be used for memory 16.

The indication system 18 provides an indication of the status of the consumable 17, such as whether the consumable 17 is due for replacement, running low, or has run out. A variety of different types of indication systems can be used depending on the particular application.

The communications system 24 is used by the printing device 11 to operatively couple and communicate to other systems and devices, such as the operator system 12 via communications network 27 or the supplier processing system 26 via a communications network 28. A variety of different types of communications networks, such as a hard wired communication network system, a wireless communications network system, the Internet, an intranet, a LAN, or a WAN, and a variety of different types of communication protocols can be used for communications networks 27 and 28.

In this particular embodiment, the operator system 12 is a computer processing system at an operator's desk which interacts with the printing device 11, although the system 12 could be a variety of different types of machines, apparatuses, or systems at other locations or could be incorporated within printing device 11.

The operator system 12 includes a central processing unit (CPU) or processor 15, a communication system 19, a display or graphical user interface 20, a memory 21, and a user input device 22, which are coupled together by a bus system or other link 23, respectively, although the operator system 12 may comprise other components, other numbers of the components, and other combinations of the components. The processor 15 may execute one or more programs of stored instructions for at least a portion of the method for ordering at least one consumable 17 for the printing device 11 in accordance with one embodiment of the present invention as described herein and illustrated in FIG. 2. In this particular embodiment, those programmed instructions are stored in memory 21, although some or all of those programmed instructions could be stored and retrieved from and also executed at other locations, such as in a printing device 11 coupled to operator system 12. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 14, can be used for memory 16.

The communications system 19 is used by the operator system 12 to operatively couple and communicate to other systems and devices, such as the printing device 11 via communications network 27. Again, a variety of different types of communications networks, such as a hard wired communication network system, a wireless communications network system, the Internet, an intranet, a LAN, or a WAN, and a variety of different types of communication protocols can be used for communications network 27.

Figure 3:
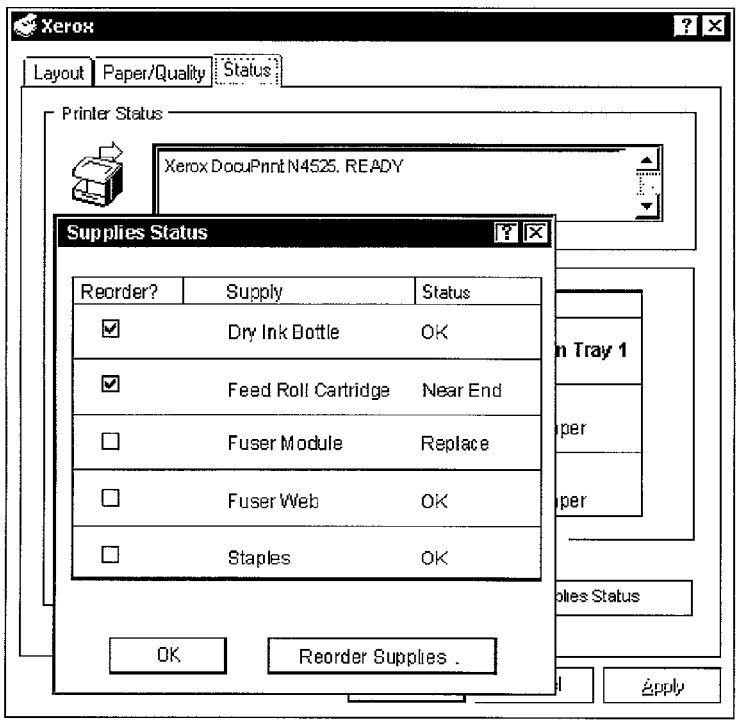
FIG. 3 is a screen shot illustrating an example of a status report for consumables for the device.

The graphical user interface or display 20 provides a display of the information to the operator, such as information about status of each consumable 17 as shown in FIG. 3 obtained from the indication system 18 in printing device 11 or information confirming an order for a consumable 17. A variety of different types of displays can be used such, such as a cathode ray tube display device.

The user input device 22 enables an operator to generate and transmit signals or commands to the CPU 15, such as information about what consumable 17 to check the status of or what consumable 17 to order, or to other systems, such as to printing device 11 or supplier system 26. A variety of different types of user input devices can be used, such as a keyboard, computer mouse, touch pad, or touch screen.

In this particular embodiment, the supplier processing system 26 is a computer processing system at the original manufacturer of the printing device 12, although the system 26 could be a variety of different types of machines, apparatuses, or systems at other locations, such as a computer processing system at the a retailer of the printing device 11 or a computer processing system at a supplier of consumable 17.

The supplier processing system 26 includes a central processing unit (CPU) or processor 30, a memory 32, and a communication system 34 which are coupled together by a bus system or other link 36, respectively, although the supplier processing system 26 may comprise other components, other numbers of the components, and other combinations of the components. The processor 30 may executes one or more programs of stored instructions for at least a part of the method ordering at least one consumable 17 for the printing device 11 in accordance with one embodiment of the present invention as described herein, such as processing the received order for the consumable 17 or consumables. In this particular embodiment, those programmed instructions are stored in memory, although some or all of those programmed instructions could be stored and retrieved from and also executed at other locations, such as in a printing device 11 coupled to supplier system 26. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 30, can be used for memory 32. The communications system 34 is used by the supplier processing system 26 to operatively couple and communicate to other systems and devices, such as the printing device 11, the operator system 12, or other suppliers via the communications networks 27 and 28 in this example.

Figure 2:
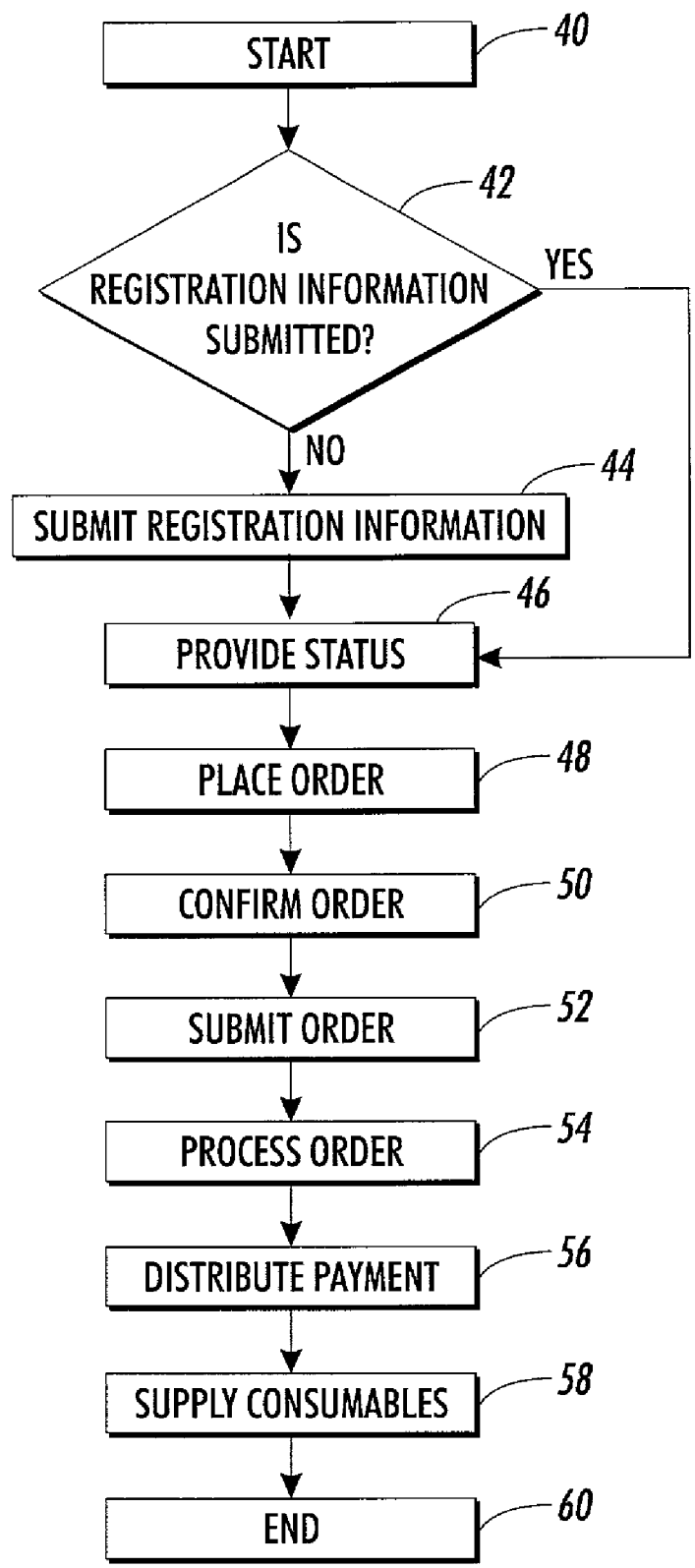
FIG. 2 is a flow chart of a method for ordering at least one consumable for the device using the device in accordance with the present invention.

A method for ordering at least one consumable 17 for the printing device 11 in accordance with one embodiment of the present invention will now be described with reference to FIG. 2. In step 40, the method for ordering at least one consumable 17 starts.

In step 42, a determination is made on whether the registration information, such as the name and address of the customer, the name and address of the retailer where the printing device 11 was purchased, and the type of printing device 11 purchased, was submitted by the purchaser of the printing device 11 and entered into a database, such as memory 32. Typically, when a consumer purchases a printing device 11 at a retailer, the customer will be asked to complete and submit a registration form, although the information can be obtained from the customer at other times and in other manners. If registration information has been submitted, then the Yes branch is taken to step 46. If registration information has not submitted, then the No branch is taken to step 44.

In step 44, the registration information for the printing device 11 is submitted by the operator of the printing device 11 via operator system 12. This information can be submitted in a variety of different manners. For example, if registration information has not been completed or has been partially completed, when printing device 11 is turned on operator system 11 coupled to the printing device 12 may be prompted on the display 20 to enter the registration information using user input device 22. In this particular embodiment, this submitted registration information is transmitted via communications network 28 for storage in memory 32 in supplier system 26 for the manufacturer of the printing device 11, although the information can be stored at other locations.

In step 46, an operator at operator system 12 using user input device 22 can submit a request for the status of the consumable 17 and any other consumables in printing device 11 and/or other information, such as information about ordering the consumable 17 or consumables. This request is transmitted to the printing device 11 via communications network 27. The printing device 11 obtains this request and determines the status of the consumable 17 using the indication system 18. This status information and/or any other requested information, such as the ordering information, is transmitted back to the operator system 12. In this particular embodiment, the status information about the consumable 17 and the information for placing an order for the consumable 17 is displayed on graphical user interface 20.

In step 48, an operator at operator system 12 using user input device 22 will place an order for at least one consumable 17. The order may also contain other information, such as the name and address of the customer, the name and address of the retailer where the printing device 11 was purchased, and the type of printing device 11 purchased. An example of a completed order sheet for consumables, such as consumable 17, on the graphical user interface 20 is illustrated in FIG. 3.

Figure 4:
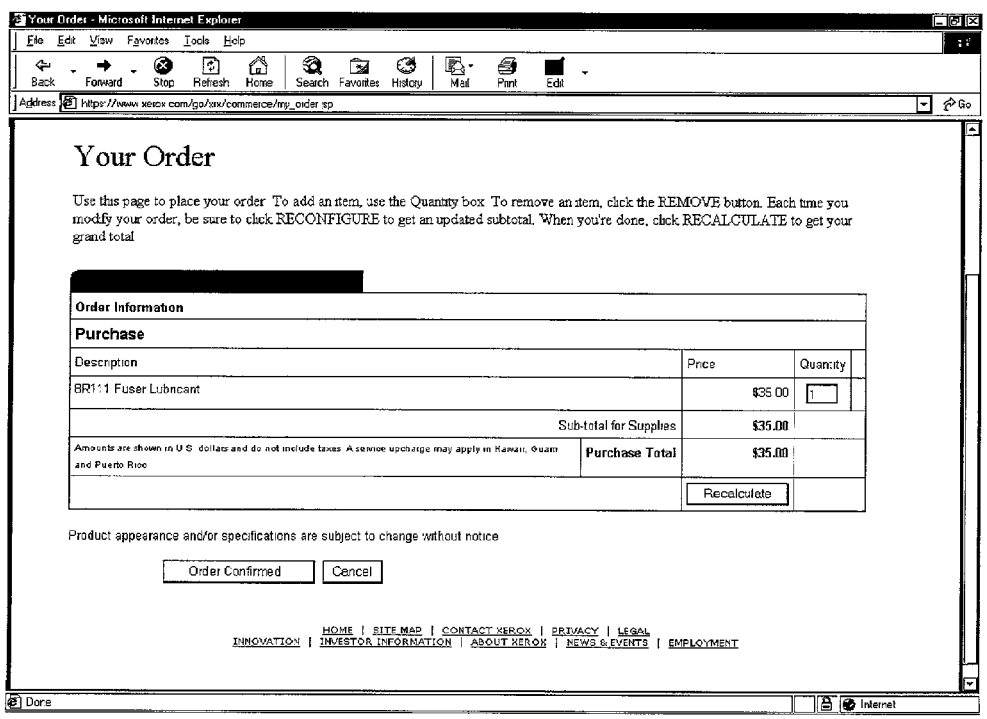
FIG. 4 is a screen shot illustrating an example of a confirmation report for an order for consumables for the device.

Referring back to FIG. 2, in step 50 processor 15 can generate a confirmation of the placed order which is displayed on the graphical user interface 20. An example of such a confirmation on the graphical user interface 20 is illustrated in FIG. 4.

Referring back to FIG. 2, in step 52 the confirmed the order is transmitted or submitted to supplier system 26 via communications networks 27 and 28, although other techniques for submitting the order using other communication channels can be used.

In step 54, the order is received and is processed by the supplier processing system 26 which in this particular example is the original manufacturer of the printing device 11. The order may be filled by the supplier processing system 26 or may transmitted to another supplier or suppliers to complete some or all of the order. Supplier processing system 26 may also generate and transmit a confirmation that the order has been received to the operator system 12 or to another location, such as a designated e-mail address for the operator who placed the order or to printing device 11.

In step 54, the order may also be processed by supplier processing system 26 to determine the identity of the retailer where the printing device 11 was originally purchased. If information about the identity of the retailer of printing device 11 is not provided, the supplier processing system may interrogate the operator system 12 and/or the printing device 11 which placed the order for this information.

In step 56, the supplier processing system may use this information to allocate and/or distribute at least a portion of the payment made to the supplier processing system 26 for the purchase of consumable 17 to the original retailer of the printing device 11 or to another party as desired for the particular application. This distribution of a portion of the profit helps to maintain or preserve the business relationship between the original retailer of the printing device 11 and the manufacturer of the printing device 11 or another supplier who has filled the order for the consumable. As a result, even though the original retailer did not make the sale for the consumable, the original retailer shares in the profits of the sale.

In step 58, the consumable 17 or consumables are supplied or delivered to the operator who placed the order. In step 60, the method ends.

Accordingly, the present invention allows a customer to order supplies for a printing device 11, such as a network-connected printer or other multifunction device, directly through the graphic user interface 20 of the printing device 11. This makes the ordering or reordering process for a consumable 17 or consumables 12 fast, easy and convenient. The ease of use also makes it less likely that a customer will run out of a consumable 17 or consumables. Further, since the device is already programmed with the particular types of consumables used by the printing device 11, it is less likely that there will be an error when the order is filled. With prior ordering techniques, there is a greater chance for an error because the operator has to determine what the appropriate replacement is for the order. The present invention will also help to direct sales to a particular target or targets, such as to the original retailer, which should result in additional sales of consumables for that retailer over the life of the printing device 11.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method comprising:
   displaying with a device a status of a plurality of consumables of a peripheral device and information about ordering at least one of the consumables when at least one condition occurs;
   monitoring with the device for an input indicating that an order for the at least one of the consumables has been placed;
   submitting with the device the order for the at least one of the consumables to a supplier if the monitored input indicates an order should be placed;
   processing the order for the at least one of the consumables, wherein the processing comprises retrieving information about the peripheral device that placed the order;
   supplying the at least one of the consumables based on the processed order; and
   determining a distribution of at least a portion of the payment based on the retrieved information,
   wherein the retrieved information identifies a retailer that sold the peripheral device and wherein the determining the distribution allocates the at least a portion of the payment to the identified retailer.

2. The method as set forth in claim 1 wherein the at least one condition is receipt by the peripheral device of a request for at least one of the status of the consumables and the information about ordering the at least one of the consumables.

3. The method as set forth in claim 1 wherein the at least one condition is an indication in the peripheral device that replacement of the at least one of the consumables is recommended based on at least one criterion.

4. The method as set forth in claim 1 further comprising confirming the order before the submitting of the order.

5. A computer readable medium having stored thereon instructions for ordering at least one consumable for a peripheral device which when executed by a processor, causes the processor to perform the steps of:
   displaying with a device a status of a plurality of consumables of a peripheral device and information about ordering at least one of the consumables when at least one condition occurs;
   monitoring with the device for an input indicating that an order for the at least one of the consumables has been placed;
   submitting with the device the order for the at least one of the consumables to a supplier if the monitored input indicates an order should be placed; processing the order for the at least one of the consumables, wherein the processing comprises retrieving information about the peripheral device that placed the order;
   supplying the at least one of the consumables based on the processed order; and
   determining a distribution of at least a portion of the payment based on the retrieved information,
   wherein the retrieved information identifies a retailer that sold the peripheral device and wherein the determining the distribution allocates the at least a portion of the payment to the identified retailer.

6. The method as set forth in claim 5 wherein the at least one condition is receipt of a request for at least one of the status of the at least one of the consumables and the information about ordering the at least one of the consumables.

7. The method as set forth in claim 5 wherein the at least one condition is an indication that replacement of the at least one of the consumables is recommended based on at least one criterion.

8. The method as set forth in claim 5 further comprising confirming the order before the submitting of the order.

9. A system comprising:
   a display system that displays a status of a plurality of consumables for a peripheral device and information about ordering at least one of the consumables when at least one condition occurs;
   a monitoring system with the device that monitors for an input indicating that an order for the at least one of the consumables has been placed;
   an ordering system with the device that submits the order for the at least one of the consumables to a supplier if the monitored input indicates an order should be placed;
   an order processing system that processes the order for the at least one of the consumables, wherein the order processing system retrieves information about the device that placed the order; and
   a supply system that supplies the at least one consumable based on the processed order,
   wherein the order processing system determines a distribution of at least a portion of the payment based on the retrieved information and the retrieved information identifies a retailer that sold the peripheral device and wherein the order processing system allocates the at least a portion of the payment to the identified retailer.

10. The method as set forth in claim 9 wherein the at least one condition is receipt by the peripheral device of a request for at least one of the status of the at least one of the consumables and the information about ordering the at least one of the consumables.

11. The method as set forth in claim 9 wherein the at least one condition is an indication in the peripheral device that replacement of the at least one of the consumables is recommended based on at least one criterion.

12. The method as set forth in claim 9 further comprising a confirmation system that confirming the order before the submitting of the order by the ordering system.

13. A method for ordering at least one consumable for a peripheral device, the method comprising:
   submitting an order with the peripheral device for the at least one consumable for the peripheral device;
   processing the order for the at least one consumable, wherein the processing comprises retrieving information about the peripheral device that placed the order; and
   determining a distribution of at least a portion of a payment for the order based on the retrieved information, wherein the retrieved information identifies a retailer that sold the peripheral device, and the distributing further comprises allocating the at least a portion of the payment to the retailer that sold the peripheral device.

14. The method as set forth in claim 13 further comprising indicating a status of the at least one consumable, wherein the submitting is based on the indicating.

15. The method as set forth in claim 13 further comprising supplying the at least one consumable based on the processed order.

16. A computer readable medium having stored thereon instructions for ordering at least one consumable for a peripheral device which when executed by a processor, causes the processor to perform the steps of;
- submitting an order with the peripheral device for the at least one consumable for the device;
- processing the order for the at least one consumable, wherein the processing comprises retrieving information about the peripheral device that placed the order; and
- determining a distribution of at least a portion of a payment for the order based on the retrieved information, wherein the retrieved information identifies a retailer that sold the peripheral device, and the distributing further comprises allocating the at least a portion of the payment to the retailer that sold the peripheral device.

17. The medium as set forth in claim 16 further comprising indicating a status of the at least one consumable, wherein the submitting is based on the indicating.

18. The medium as set forth in claim 16 further comprising supplying the at least one consumable based on the processed order.

19. A system for ordering at least one consumable for a peripheral device, the system comprising:
- an ordering system that submits an order with the device for the at least one consumable for the peripheral device;
- a processing system that processes the order for the at least one consumable, wherein the order processing system retrieves information about the peripheral device that placed the order including the identification a retailer that sold the peripheral device; and
- a payment distribution system that determines a distribution of at least a portion of a payment for the order based on the retrieved information, and the distributing further comprises allocating the at least a portion of the payment to the retailer that sold the peripheral device.

20. The system as set forth in claim 19 further comprising an indication system that indicates a status of the at least one consumable, wherein the submitting is based on the indicating.

21. The system as set forth in claim 19 further comprising a supply system that supplies the at least one consumable based on the processed order.

* * * * *